Feb. 25, 1958     T. PETERSEN     2,824,772
PIN SUPPORT
Filed March 28, 1955
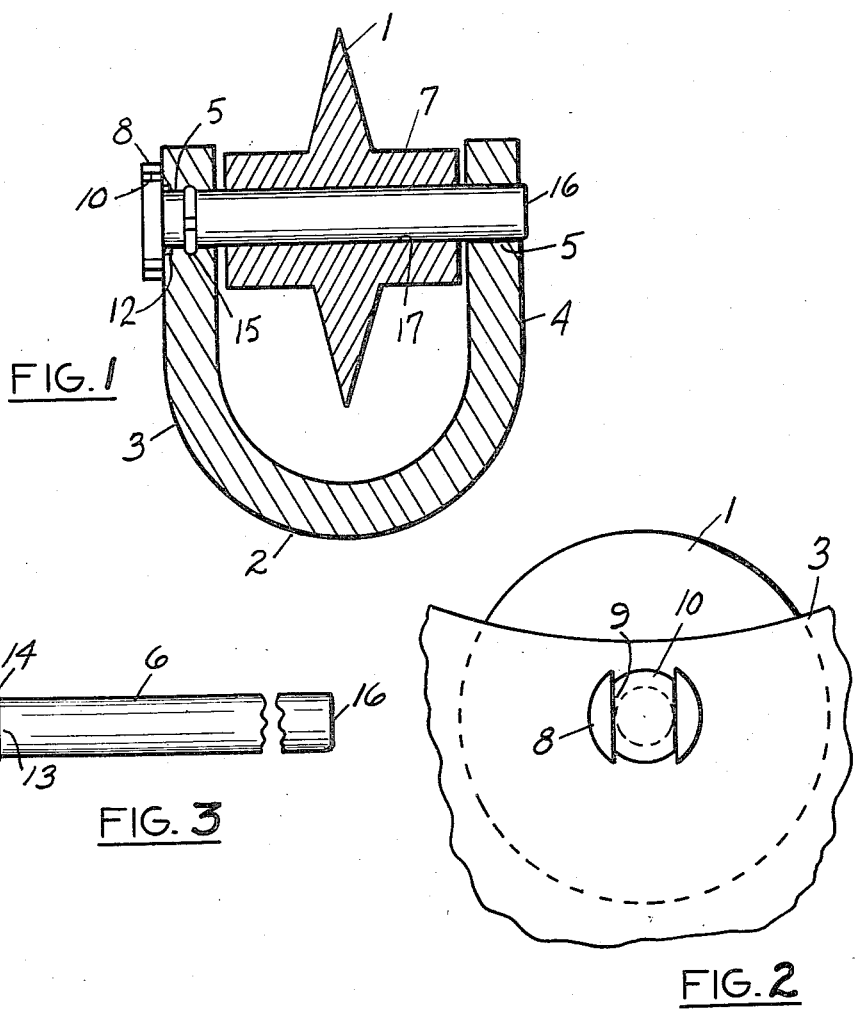

United States Patent Office 2,824,772
Patented Feb. 25, 1958

2,824,772
PIN SUPPORT

Thorvald Petersen, Erie, Pa., assignor to Reed Manufacturing Company, Erie, Pa., a corporation of Pennsylvania Application March 28, 1955, Serial No. 497,139

1 Claim. (Cl. 308—18)

This application is a continuation in part of application Serial No. 327,105, filed December 20, 1952, now Patent 2,739,281.

In pipe cutters the cutting and guide wheels are journaled on stationary pins in the pipe cutter structure. Since the wheels frequently have to be changed in the field, it is desirable that the pins be easy to remove and replace. This invention is intended to provide such a structure.

In the drawing, Fig. 1 is a section through a pipe cutter wheel and its supporting structure; Fig. 2 is a side view and Fig. 3 is a side view of the removable pin.

In the drawing, Fig. 1 shows the supporting structure for a cutting wheel 1 which comprises a channel-shaped section 2 having side flanges 3 and 4 having aligned opening 5 therein for receiving a pin 6 on which the hub 7 of the cutting wheel 1 is journaled.

On the flange 3 are spaced projections 8 for engaging flats 9 on the enlarged head 10 of the pin so as to non-rotatably hold the pin. From one aspect, the projections 8 provide a non-circular recess for receiving the non-circular head of the pin.

Adjacent the head 10 of the pin is an enlarged counter-bore 12 in the outer end of the opening 5 in the flange 3. Adjacent the head 10 of the pin is a groove 13 carrying a split snap ring 14 having a normal diameter slightly larger than the internal diameter of the pin receiving opening 5 in the flange 3. Within the opening 5 in the flange 3 is an internal groove 15 which receives the snap ring 14 and releasably holds the pin in place. The groove 15 is spaced inward from the counter-bore 12. The purpose of the counter-bore 12 is to receive the snap ring 14 in an approximately centered position with respect to the groove 15. Locating the snap ring 14 adjacent the head 10 makes the pin very easy to assemble. Essentially no force is required to insert the leading end 16 of the pin through the opening 5 in the flange 3 and through the bore 17 in the hub 7 and part way into the opening 5 in the flange 4. It is only after the pin is in place that a driving force is required to force the snap ring 14 into the opening 5 in the flange 3 so that it can expand into locking engagement with the groove 15. This makes the assembly of the pin much easier than as if the snap ring 14 were located at the leading end 16 of the pin. With that location the snap ring would resist the entire inserting movement of the pin.

The advantages of the pin construction can best be demonstrated by following through the steps of assembling the pin. The body of the pin 6 is of smaller diameter than the openings 5 in the flanges 3 and 4 and than the bore 17 in the hub 7 of the wheel 1. Accordingly, the leading end 16 of the pin can easily be inserted through the opening 5 in the flange 3 and will encounter negligible resistance. After the leading end passes through the opening 5 in the flange 3 it must enter the bore 17 in the hub which is blind insofar as the user is concerned. However, because the pin is loose in the hole 5 in the flange 3 and also has a loose fit in the bore 17, it is easy to insert the leading end 16 into the bore 17 by moving the wheel 1 so the bore comes into alignment with the pin. This can be easily done by feeling the resistance offered to the movement of the pin. Negligible resistance is likewise offered as the leading end 16 of the pin moves through the bore. When the pin reaches the end of the bore, if the leading end 16 is out of alignment with the opening 5 in the flange 4, the operator can easily tell by the added resistance. Again the operator can by touch move the wheel 1 back and forth so as to bring the leading end 16 of the pin into alignment with the opening 5 in the flange 4 after which the pin freely slides into the opening. At this stage, the pin is located in both of the openings 5 and the snap ring 14 is adjacent the bottom of the enlarged recess 12. This is the first time that any substantial resistance will be offered to the assembly of the pin. However, because the pin is now aligned and in proper position, it is easy to drive the pin home by a tap on the head 10. Once in place, the pin is held by the snap ring 14. During all the initial stages of the assembly, negligible resistance is offered if the pin is properly aligned and the added resistance offered when the parts are out of alignment enables the operator to tell by touch when the pin is properly aligned. None of these advantages would be obtained if the snap ring 14 were moved from the head end of the pin over to the leading end 16. With the snap located at the leading end 16, resistance would be offered to the movement of the pin through the opening 5 in the flange 3, to the movement of the pin through the bore 17 in the hub 7, and to movement of the pin through the opening 5 in the flange 4. Because the assembly of the pin would be continuously resisted by the snap ring the operator could not tell by feel if the parts were out of alignment and could not "feel" the pin into its proper position.

The head end location of the snap ring also simplifies removal. By using a spare pin, the pin can be driven out until the snap ring is clear of the opening 5 in the flange 3. Thereafter no driving force is necessary. Only at the start of the removal (and at the end of the insertion) does the snap ring in any way oppose movement of the pin.

What is claimed as new is:

In a structure for removably supporting a pin and a hub journaled on the pin, spaced supporting walls having aligned pin receiving openings therein, a hub between the walls and provided with a bore, a pin extending through said openings and the bore of the hub to rotatably support the hub thereon, said pin having an enlarged head at one end only, non-circular surfaces on said head, complementary surfaces on one of said spaced walls providing a non-circular recess engaging the non-circular head to hold the pin against rotation, a groove in the pin adjacent the head of the pin, a snap ring in the groove and having a portion thereof projecting outside the periphery of the pin in its unstressed position, and an internal groove within the opening in said one wall adjacent the head end of the pin, the portion of the snap ring projecting outside the groove in the pin being received in the internal groove and releasably holding the pin in place.

References Cited in the file of this patent
UNITED STATES PATENTS

| 2,071,756 | Manville | Feb. 23, 1937 |
| 2,635,931 | May | Apr. 21, 1953 |

FOREIGN PATENTS

| 29,211 | Great Britain | 1912 |